Aug. 15, 1950 M. F. JONES 2,519,253
TWO-PHASE LINEAR-MOTOR CATAPULT-SYSTEM
Filed Feb. 24, 1947 2 Sheets-Sheet 2
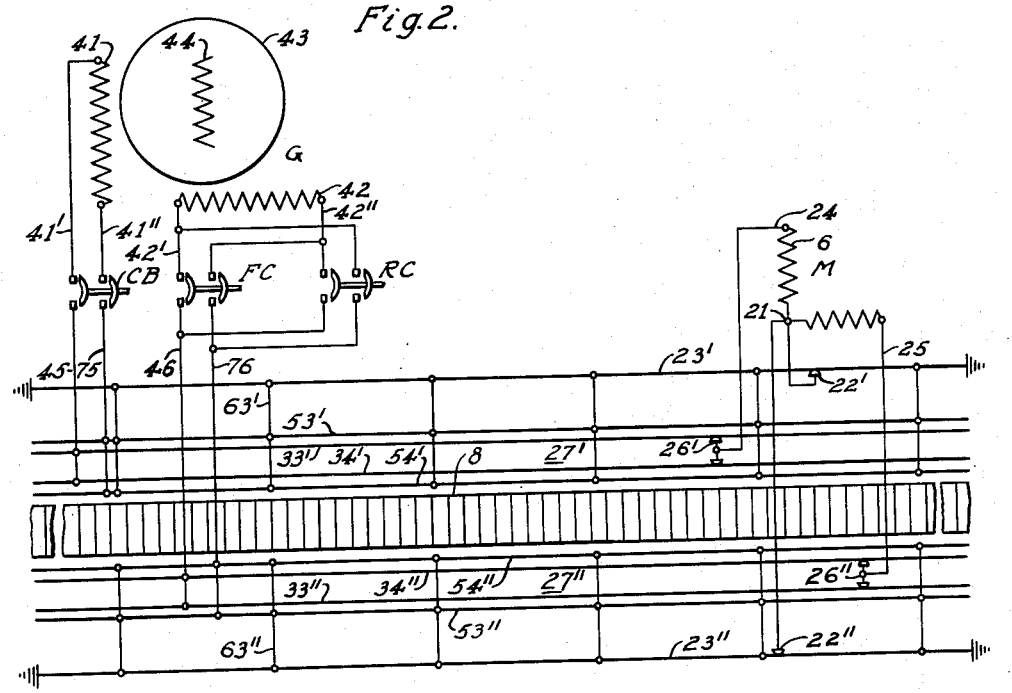
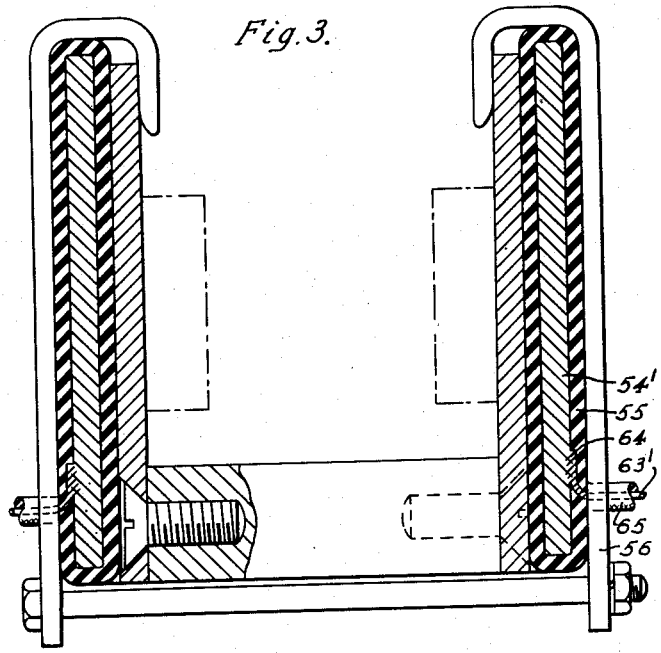
WITNESSES:
INVENTOR
Maurice F. Jones.
BY O. B. Buchanan
ATTORNEY Patented Aug. 15, 1950

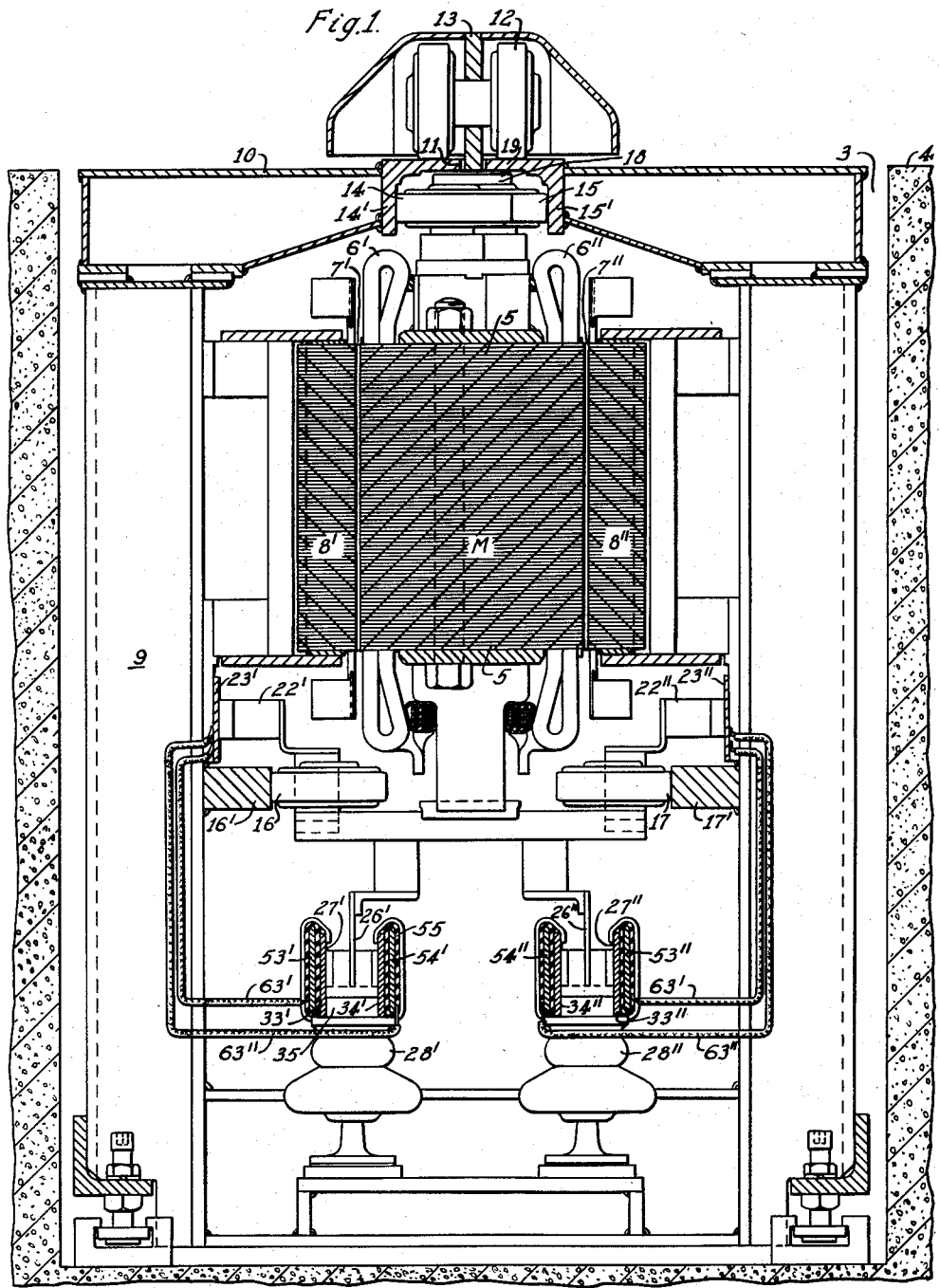

2,519,253

UNITED STATES PATENT OFFICE 2,519,253

TWO-PHASE LINEAR-MOTOR CATAPULT SYSTEM

Maurice F. Jones, Pittsburgh, Pa., assignor to Westinghouse Electric Corporation, East Pittsburgh, Pa., a corporation of Pennsylvania Application February 24, 1947, Serial No. 730,431

3 Claims. (Cl. 318—135)

My invention relates to linear-motor electric catapults, for launching aircraft by means of a shuttle-car which travels down the landing-field, or flight-deck of an aircraft carrier, pulling the aircraft for an assisted launching. The shuttle-car carries the primary core and the polyphase primary windings of a linear motor, the secondary of which consists of a flat squirrel-cage core and winding, which extends in a straight line down the landing-field, in the direction of the launching.

Heretofore, three-phase power has been utilized, as broadly described and claimed in a Powers Patent 2,404,984, granted July 30, 1946, assigned to the Westinghouse Electric Corporation. This has entailed two drawbacks which are overcome in my present invention. In order to terminate the accelerating or launching run of the shuttle-car, it has been necessary to remove the forward-phase-sequence power, and to apply suitable braking-power, usually reverse-phase-sequence power. In a three-phase system as heretofore used, this operation involved a coasting-period having a duration of about 0.2 second, between the removal of the forward-phase-sequence power and the application of the reverse-phase-sequence power. At a speed of 200 miles per hour, the shuttle-car travels some 60 feet during this time, thus wasting that much track which is not utilized in either accelerating or decelerating the shuttle-car. This saving is particularly important where the catapult is mounted on shipboard, or where space is at a premium for any reason.

A second disadvantage of the three-phase shuttle-car supply is the necessity for a rather elaborate feeder-system, involving one or more sets of three-phase buses, each comprising three flat insulated bus-bars stacked closely side-by-side, with different locations of the several phases in the two bus-systems, in order to produce a substantially non-inductive feeder-system, as described and claimed in an application of Lee A. Kilgore and myself, Serial No. 506,198, filed October 14, 1943, patented December 10, 1946, No. 2,412,512. This three-phase feeder-bus system also involved a somewhat complicated collector-rail system, involving numerous jumpers between the two insulated third-rail structures and the corresponding phases of the three feeder-buses which extended along the entire length of the track.

An object of my present invention is to provide a two-phase linear-motor catapult-system, which avoids both of these objectionable features of the three-phase system, in a manner which will be subsequently described, and which thus constitutes a noteworthy improvement, notwithstanding the fact that the art of commercial polyphase electricity-distribution has long since standardized on a three-phase system, as being more economical, and better suited for general electrical uses, than the two-phase system.

With the foregoing and other objects in view, my invention consists in the systems, combinations, structures and operations hereinafter described and claimed, and illustrated in the accompanying drawing, wherein:

Figure 1 is a vertical transverse section across the runway, showing an end view of my two-phase shuttle-car, Fig. 2 is a much simplified diagrammatic view of circuits and apparatus illustrating my two-phase electric-catapult system, and Fig. 3 is a detailed transverse sectional view of one of the insulated third-rail structures.

In the form of embodiment of my invention, which I have chosen for illustration, the shuttle-car is shown, at M in Figure 1, as being a long narrow vertically disposed car, operating within a trough 3 extending down the runway of the landing-field 4, somewhat after the manner which is described and claimed in my application Serial No. 537,514, filed May 26, 1944, patented December 10, 1946, No. 2,412,511. The shuttle-car M is illustrated as a double-motor car, comprising, in effect, two flat linear-motor cores, disposed back-to-back, these cores being illustrated as being integral with each other, and comprising a single stack of laminations 5. The double shuttle-car core 5 carried two two-phase primary windings 6′ and 6″ which are disposed adjacent to the motor airgap 7′, 7″ which is at either side of the double core 5.

The double primary core 5, which is a part of the car M, moves between two stationary vertically disposed squirrel-cage structures 8′ and 8″, respectively, one on each side of the primary core, with an airgap 7′ or 7″ therebetween. The squirrel-cage structures 8′ and 8″ are carried by a suitable supporting-frame 9 which is mounted in the trough 3 in the field, and which has a top-structure 10 which is flush with the surface of the field 4 and which has therein a centrally disposed slot 11 which extends the entire length of the trackway.

In the diagrammatic view of Fig. 2, the two two-phase primary-windings 6′ and 6″ are shown, for simplicity, as a single winding 6, and the two squirrel-cage structures 8' and 8" are shown, for simplicity, as a single squirrel-cage structure 8.

Any suitable means may be utilized for suspending and guiding the shuttle-car M in the trough 3. In the illustrative structure which is shown in Fig. 1, the shuttle-car is suspended on rollers 12, rolling on the top 10 of the supporting-structure 9, on either side of the slot 11. There are a plurality of pairs of rollers 12, and depending from them are one or more vertical supporting-plates or plows 13, which extend down through the slot 11, to support the underground portions of the shuttle-car M.

An advantage of the double-motor shuttle-car construction is that the very strong magnetic pulls, between the primary and secondary cores 5 and 8', and 5 and 8", are opposed to each other, so that the car-structure is considerably relieved of mechanical strains due to these strong magnetic attractive forces. The car must be supported against lateral displacements, relative to the two stator-cores 8' and 8", and the stator-cores must be prevented from collapsing onto the primary core 5, by reason of the magnetic pull of the latter, as by means of a plurality of laterally bearing rollers 14, 15, 16 and 17 disposed at both the top and bottom of the primary core-structure 5, and bearing on suitable lateral-thrust rails 14', 15', 16' and 17' carried by the supporting-structure 9. Provision is also made to restrain the shuttle-car against the upward component of the pull of the towing-cable (not shown), which is attached to the above-ground car-portions, and to this end, suitable lift-resisting rollers 18 are provided, bearing against the under-surface 19 of the top-member 10 of the supporting-structure 9.

In accordance with my invention, each of the primary windings 6' and 6", is a two-phase winding, and these windings are connected together in parallel with each other, so that they can be represented diagrammatically as a single winding 6 in Fig. 2. The two motor-phases have a common junction-point 21, which is connected to two sets of current-collector shoes 22' and 22" which bear on bare copper current-collector rails 23' and 23" which are brazed or otherwise attached to the supporting steel structure 9 at the respective sides of the supporting-structure, underneath the respective secondary cores 8' and 8" in Fig. 1.

The two-phase motor-windings 6' and 6", (or 6, as diagrammatically shown in Fig. 2), have two phase-terminals 24 and 25, (Fig. 2), which are connected respectively to two sets of double-shoe, current-collectors 26' and 26" which are disposed at the bottom of the car-structure, and which run between the twin rails of two twin-rail third-rail structures 27' and 27", respectively, which are supported on insulators 28' and 28" which are carried by the base-portion of the stator supporting-structure 9.

The double-rail third-rail assemblies 27' and 27" have a special construction, in accordance with my present invention. As both are alike, a description of one will suffice for both. The construction of the third-rail assembly 27' is shown in detail in Fig. 3. It has two vertical, spaced, bare copper third-rail buses 33' and 34', the opposing faces of which are engaged by the double current-collecting shoes 26'. These two copper third-rail buses 33' and 34' are spaced by a plurality of bottom spacing-plates 35 which are mounted on top of the supporting-insulators 28'. The two corresponding copper third-rail buses of the other third-rail assembly 27", are indicated by the numerals 33" and 34" in Figs. 1 and 2.

As shown in Fig. 2, the copper third-rail buses 33' and 34' are used, not only as current-collecting rails, but also as a two-conductor feeder-bus for one terminal of one phase of the two-phase power-supply for the catapult.

As shown in Fig. 2, this power-supply is a synchronous generator G, having two completely insulated primary windings 41 and 42 in quadrature phase-relation to each other, said windings having the terminals 41', 41" and 42', 42", respectively. The generator G is shown as having a rotor-member 43 having a direct-current exciting-winding 44. One of the phase-windings, namely the winding 41, is arranged for connection to the catapult feeder-system without phase-reversal, as by means of the two-pole circuit-breaker CB. The other phase-winding 42 of the generator is arranged for connection to the catapult feeder-system in either the forward or reverse direction, by means of "forward" and "reverse" two-pole contactors FC and RC, respectively.

The circuit-breaker CB connects one of the terminals of the phase-winding 41 to a bus-bar connection 45, which is connected to the two insulatedly mounted third-rail buses 33' and 34', usually at some centrally located point along the trackway. In like manner, the forward and reverse contactors FC and RC, whichever one is closed, connect one of the phases of the other phase-winding 42 of the generator to a bus-bar connection 46 which is connected to the other pair of insulatedly mounted third-rail buses 33" and 34".

In order to provide a non-inductive two-phase feeder-system, it is important that a return-circuit conductor shall be disposed as closely as possible to each of the two pairs of insulatedly mounted phase-conductors or buses 33', 34' and 33", 34". In accordance with my invention, this result is achieved by providing a completely insulated return-conductor, in the form of a flat copper bus-bar, lying flat against the outer face of each of the four insulatedly mounted phase-conductor buses 33', 34', 33" and 34". These four return-conductors are designated 53', 54', 53" and 54", respectively. Each of these conductors is completely covered by solid insulation, as indicated at 55, and this insulation is usually impregnated with a liquid. The return-conductors, such as 53', 54' in Fig. 3, are held in their proper assembled relation, with respect to the insulatedly supported, bare third-rail bus-conductors 33', 34', by suitable clamping-means 56.

Some means must be provided for electrically connecting the four return-conductors 53', 54', 53" and 54" to the grounded copper current-collector buses 23' and 23", which are connected to the junction-point 21 of the two phase-windings of the shuttle-car M, through the current-collector shoes 22' and 22", respectively. To this end, I provide a number of jumpers 63' and 63", disposed at frequent intervals along the entire length of the trackway, for connecting the grounded current-collector buses 23' and 23" to the two pairs of return-conductors 53', 54' and 53", 54".

The jumpers, such as the jumper 63' in Fig. 3, are connected to their corresponding return-circuit bus-bars, such as the bus-bar 54', by welding or brazing, as indicated at 64. Furthermore, even though the opposite ends of the jumpers 63', 63'' are connected to one or the other of the grounded copper buses 23', 23'', the jumpers are nevertheless completely covered with insulation, as shown at 65, except at the extreme grounded end where the connection is made to the grounded bus-bar 23' or 23''. Furthermore, this jumper-insulation 65 is merged completely with the return-conductor insulation 55, as shown in Fig. 3. Although the return-conductor bus-bars 53', 54', 53'' and 54'' are thus grounded, they must nevertheless be completely insulated, because they are clamped in contact with the live, bare phase-conductor buses 33', 34', 33'' and 34'', respectively. The grounding jumpers 63' and 63'', which are connected to these insulated return-conductor buses, must be insulated, as shown at 65, in order to provide an adequately long insulating creepage-path from each of the live current-collecting feeder-buses 33', 34', 33'' and 34'', to ground.

At the point where the bus-bar connections 45 and 46 are provided, other bus-bar connections 75 and 76 are provided, for connecting the second terminals of the respective generator-windings 41 and 42 to the two pairs of return-conductors 53', 54' and 53'', 54'', respectively, as shown in Fig. 2. The four bus-bar connections 45, 75, 46, 76 thus constitute a two-phase four-wire power-supply system.

In operation, a forward accelerating-run of the shuttle-car M, as in a plane-launching operation, will be initiated by simultaneously closing the circuit-breaker CB and the forward contactor FC. This applies two-phase power from the generator G to the motor-windings M, in the forward phase-sequence, utilizing the insulated current-collector buses 33' and 34' as an extension of the power-terminal 45, and utilizing the return-conductor buses 53' and 54' as an extension of the power-terminal 75, thus connecting the generator phase-winding 41 to one phase of the motor-winding 6. In like manner, the other pair of insulated current-collector buses 33'' and 34'' are utilized as extensions of the power-terminal 46, and the corresponding pair of return-conductor buses 53'' and 54'' are utilized as extensions of the power-terminal 76, thus connecting the second generator phase-winding 42 to the other phase of the motor-winding 6, as shown in Fig. 2.

It will be understood that the trackway of the catapult extends for a quarter of a mile, more or less, according to the length of the runway on the landing-field, so that power is carried, in general, for a considerable distance, before it is delivered to the shuttle-car M. Practically all of the power which is collected by the grounded-rail current-collector shoes 22' and 22'' of the car flows promptly into the corresponding grounded return-conductor buses 53', 54', 53'' and 54'', through the jumpers 63' and 63'' which are closest to the car, wherever the car may be located, at any particular instant, along the entire length of the runway. Thus, for the entire distance over which power must be transmitted, from the generator G to the motor or shuttle-car M, all of it, except for a relatively few feet near the shuttle-car M, is delivered over a substantially non-inductive system of feeder-buses, in which the non-inductive characteristic is obtained by insulating the return-conductors 53', 54', 53'' and 54'', and placing them flat up against the corresponding live conductors 33', 34', 33'' and 34''.

It will also be noted that this non-inductive characteristic is achieved in a much more simple and economical manner than is necessary in a three-phase system, as described and claimed in the previously mentioned application of Lee A. Kilgore and myself.

At the end of the accelerating or plane-launching run of the shuttle-car M, it is necessary to quickly bring the shuttle-car to a stop, so as not to waste any more trackage or landing-field space than is absolutely required in order to stop the car with a reasonable factor of safety. Here, again, my two-phase motor-supply system shows its advantage over a three-phase system. My two-phase motor-winding 6 has three motor-terminals 21, 24 and 25, (Fig. 2), and this is the same number of terminals which are needed for a three-phase motor.

In reversing the phase-sequence of my two-phase motor M or 6, as shown in Fig. 2, the forward contactor FC is opened, and when its opening-operation is completed, the reverse-contactor RC is closed, the circuit-breaker CB, for the other phase, remaining closed all the while. During the fifth of a second, or other time-interval, between the opening of the forward contactor FC and the closing of the reverse-contactor RC, single-phase power is being supplied to the shuttle-car M, and the motor or shuttle-car continues to develop forward torque, as any polyphase induction motor will do, once it has attained a reasonable speed. Hence, during this single-phase energization of the shuttle-car motor M, the shuttle-car is still accelerating, and the accelerating-run does not terminate until the actual closure of the reverse-contactor RC.

This is in marked contrast to the three-phase shuttle-car system, in which there is no practical way of supplying single-phase energization to the shuttle-car during the manipulation of the forward and reverse contactors for discontinuing the forward accelerating-run and initiating the reverse-power plugging-operation for stopping the shuttle-car. It is an important advantage of my present invention, therefore, that the shuttle-car passes instantly from a condition of forward acceleration to a condition of strong deceleration, without any track-wasting coasting-operation at all.

While I have shown my invention in a single preferred form of embodiment, in connection with a circuit-diagram which is very extremely simplified, to the point of showing only the features which seem to be the most necessary for an understanding of the essential novel features of my invention, I wish it to be understood that the invention is not limited to the particular illustrated motor-structure or the particular illustrated control-circuits, other than as may be necessary to obtain some one or all of the benefits of two-phase operation and design. I desire, therefore, that the appended claims shall be accorded the broadest construction consistent with their language.

I claim as my invention:

1. In combination, a trackway-assembly, and a two-phase-motored, self-propelled movable body associated with said trackway-assembly, said trackway-assembly comprising a grounded third-rail means, and two insulatedly supported third-rail assemblies, for the respective motor-phases, each insulatedly supported third-rail having a completely insulatedly covered return-conductor secured up against it, each insulatedly covered return-conductor having a plurality of insulatedly covered jumpers, disposed at a succession of spaced points along the trackway, for joining the return-conductor to the grounded third-rail means, and said movable body having current-collector shoes bearing on said grounded third-rail means and on said insulatedly supported third-rails, respectively.

2. In combination, a trackway-assembly, a two-phase-motored, self-propelled movable body associated with said trackway-assembly, a two-phase system of current-collector rails associated with said trackway-assembly, cooperative current-collector shoes associated with said movable body, a source of two-phase electrical energy having the two pairs of phase-terminals insulated from each other, and switching-means for energizing both phases of said two-phase rail-system from said source for a forward run of the movable body, said switching-means comprising means for reversing one of the phases of said source, as applied to one of the phases of said rail-system, without interrupting the connection between the other phase of the source and the other phase of the rail-system.

3. The invention as defined in claim 1, in combination with a source of two-phase electrical energy having the two pairs of phase-terminals insulated from each other, and switching-means for energizing both sets of insulatedly supported third-rail assemblies, with their associated return-conductors, from said source for a forward run of said movable body, said switching-means comprising means for reversing one of the phases of said source, as applied to one of the phases of said third-rail assemblies, without interrupting the connection between the other phase of the source and the other phase of the third-rail assemblies.

MAURICE F. JONES.

REFERENCES CITED

The following references are of record in the file of this patent:

UNITED STATES PATENTS

| Number | Name | Date |
|---|---|---|
| 390,820 | Tesla | Oct. 9, 1888 |
| 808,944 | Porter et al. | Jan. 2, 1906 |
| 2,276,057 | McCormick | Mar. 10, 1942 |